US012665887B2

(12) United States Patent
Karinsalo et al.

(10) Patent No.: US 12,665,887 B2
(45) Date of Patent: Jun. 23, 2026

(54) METHODS AND SYSTEMS FOR CONTENT DISTRIBUTION

(71) Applicant: Adeia Guides Inc., San Jose, CA (US)

(72) Inventors: Anni Karinsalo, Oulu (FI); Pekka Koskela, Oulu (FI); Markku Kylänpää, Helsinki (FI); Ville Ollikainen, Vihti (FI)

(73) Assignee: Adeia Guides Inc., San Jose, CA (US)

( * ) Notice: Subject to any disclaimer, the term of this patent is extended or adjusted under 35 U.S.C. 154(b) by 263 days.

(21) Appl. No.: 18/242,929

(22) Filed: Sep. 6, 2023

(65) Prior Publication Data

US 2025/0080507 A1 Mar. 6, 2025

(51) Int. Cl.
*H04L 9/40* (2022.01)
*H04L 9/08* (2006.01)

(52) U.S. Cl.
CPC ........ *H04L 63/0428* (2013.01); *H04L 9/0819* (2013.01)

(58) Field of Classification Search
CPC ..... H04L 9/0894; H04L 9/0819; H04L 9/083; H04L 63/062; H04L 63/0428; H04L 63/0421
USPC ........................................................ 713/153
See application file for complete search history.

(56) References Cited

U.S. PATENT DOCUMENTS

| | | | | |
|---|---|---|---|---|
| 9,407,432 | B2 * | 8/2016 | Uzun | H04L 9/0825 |
| 9,641,323 | B2 * | 5/2017 | Kim | G06F 21/10 |
| 12,074,984 | B2 * | 8/2024 | Gilson | G06F 12/1408 |
| 12,463,948 | B2 | 11/2025 | Ollikainen et al. | |
| 2005/0144478 | A1 * | 6/2005 | Yamanaka | H04N 7/1675 |
| | | | | 726/4 |
| 2006/0165233 | A1 * | 7/2006 | Nonaka | H04L 63/062 |
| | | | | 380/44 |
| 2014/0123159 | A1 | 5/2014 | Phillips et al. | |
| 2017/0317821 | A1 | 11/2017 | Wood et al. | |
| 2024/0214362 | A1 | 6/2024 | Ollikainen et al. | |
| 2025/0165564 | A1 | 5/2025 | Ollikainen et al. | |

FOREIGN PATENT DOCUMENTS

JP 5264548 B2 8/2013

OTHER PUBLICATIONS

Fotiou et al., "Securing Content Sharing over ICN", arxiv.org, Cornell University Library, 201 Olin Library Cornell University Ithaca, NY 14853, Jul. 11, 2017, pp. 1-10.

(Continued)

*Primary Examiner* — Amare F Tabor
(74) *Attorney, Agent, or Firm* — HG LAW LLP

(57) ABSTRACT

Systems and methods are described for content distribution at a distributor. A functionally encrypted content request comprising a user identifier and a content identifier is received. The functionally encrypted content request is sent to a content provider. A content reply comprising the functionally encrypted content request and encrypted content corresponding to the content identifier is received. The content reply is decrypted using a functional user identifier decryption key to resolve the user identifier. A further content reply corresponding to the content reply is sent to a user node corresponding to the user identifier.

20 Claims, 8 Drawing Sheets

(56)                     References Cited

OTHER PUBLICATIONS

Abdalla et al., "Integrating the Functional Encryption and Proxy Re-cryptography to Secure DRM Scheme" Int. J. Netw. Secur., 19(1):27-38 (2017).

Boneh et al., "Functional Encryption: Definitions and Challenges" (ed.) TCC 2011 LNCS, 6597:253-273. Springer, Heidelberg (2011).

Canard et al., "Blind Functional Encryption" International Conference on Information and Communications Security, ICICS 2020: Information and Communications Security pp. 183-201 (2020) Abstract only.

Dorwin et al. "A W3C Standards, Encrypted Media Extensions, W3C Recommendation" https://w3c.github.io/encrypted-media/ (2017).

Hamdi, "Functional encryption for blind external data processing" Doctoral dissertation, Université de Lyon (2021).

Naveed et al., "Controlled Functional Encryption" CCS '14: Proceedings of the 2014 ACM SIGSAC Conference on Computer and Communications Security, pp. 1280-1291 https://doi.org/10.1145/2660267.2660291 (2014) Abstract only.

Petrlic et al., "Privacy-Preserving DRM for Cloud Computing" 2012 26th International Conference on Advanced Information Networking and Applications Workshops, pp. 1286-1291 (2012).

* cited by examiner

Figure 3:
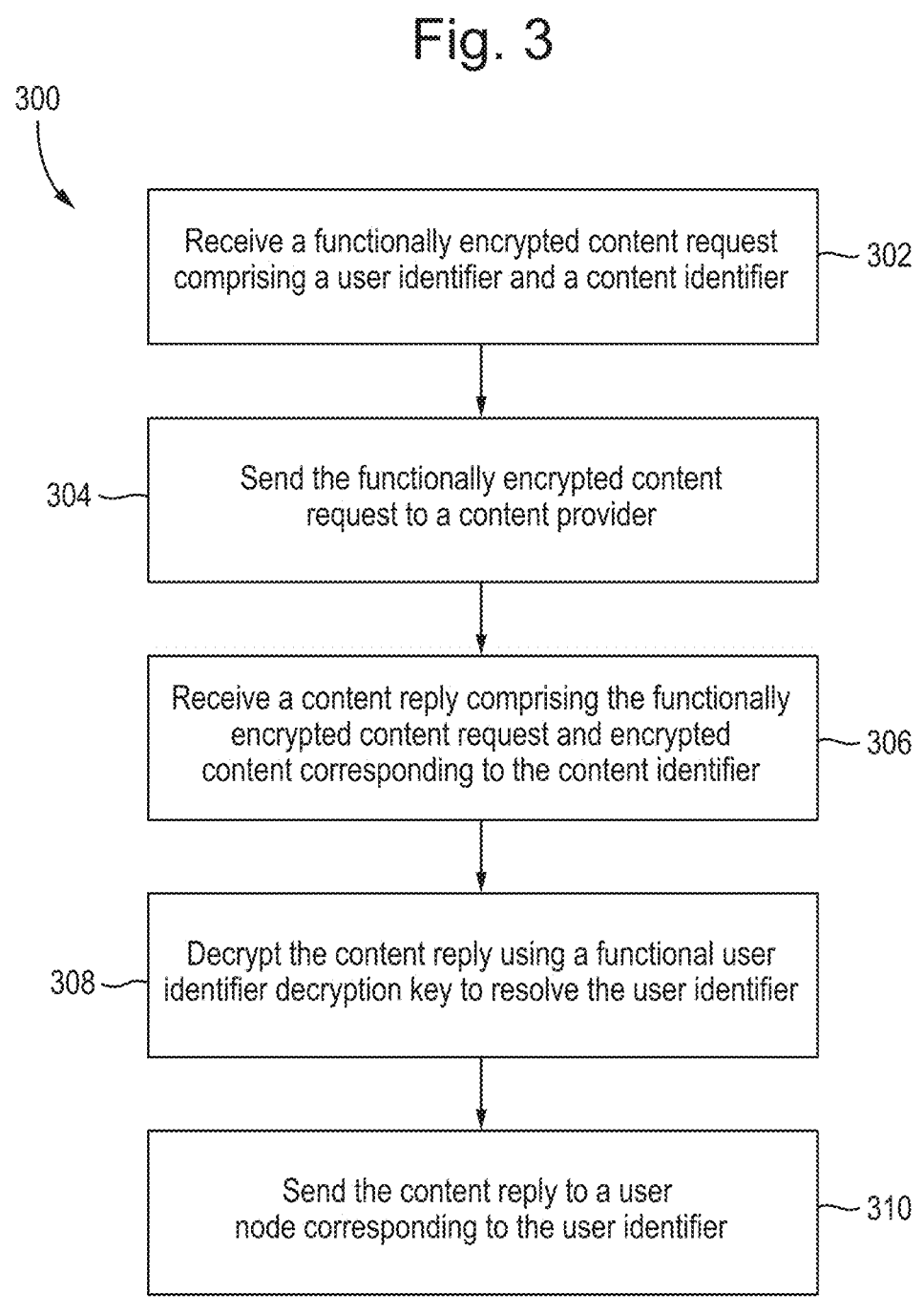

Receive a functionally encrypted content request comprising a user identifier and a content identifier — 302

Send the functionally encrypted content request to a content provider — 304

Receive a content reply comprising the functionally encrypted content request and encrypted content corresponding to the content identifier — 306

Decrypt the content reply using a functional user identifier decryption key to resolve the user identifier — 308

Send the content reply to a user node corresponding to the user identifier — 310

400

406 f'(), sk[f'()]

C

X

402

404

500

502

504

Content
Providers

506

Key manager

Distributors

508

Users

600

606 — Content Providers

Distributors — 604

602 — Users

602
User (U)

604
Distributor(D)

606
Content Provider (CP)

$m_1$
Content Req1

608

610

$m_1$
Content Req2

$m_2$
Content Reply1

612

$m_3$
Content Reply2

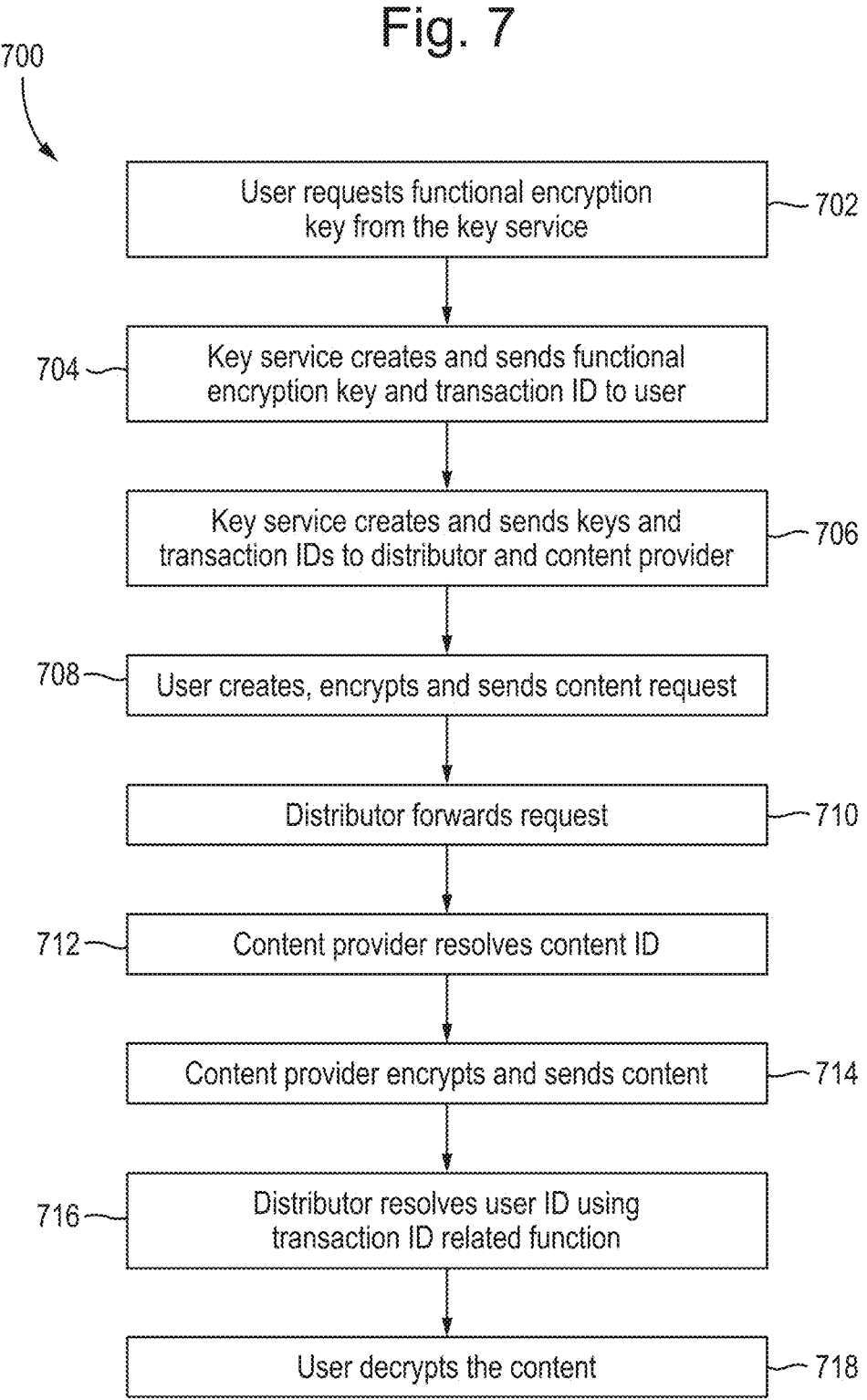

700

| User requests functional encryption key from the key service | 702 |

| Key service creates and sends functional encryption key and transaction ID to user | 704 |

| Key service creates and sends keys and transaction IDs to distributor and content provider | 706 |

| User creates, encrypts and sends content request | 708 |

| Distributor forwards request | 710 |

| Content provider resolves content ID | 712 |

| Content provider encrypts and sends content | 714 |

| Distributor resolves user ID using transaction ID related function | 716 |

| User decrypts the content | 718 |

METHODS AND SYSTEMS FOR CONTENT DISTRIBUTION

BACKGROUND

The present disclosure relates to methods and systems for content distribution. Particularly, but not exclusively, the present disclosure relates to privacy preserving content distribution.

SUMMARY

The majority of digital content provision today involves a content supplier providing digital content through a content distribution network to a user. As in other fields, many companies involved in content provision operate a business model which relies on gathering data on customer's habits and either using that data to pitch relevant services to the user, or selling that data onto third parties. Digital interaction now present in content provision means that collecting a large volume of data about a user's activities has become much easier.

In terms of network architecture, the present-day norm in content delivery is for content distributors to use content delivery networks to distribute content to servers close to media consumers, so that media consumers can enjoy a high quality of network service when downloading or streaming media to their device. By sharing the storage and network bandwidth of many consumers in a local area, networks such as Peer-to-Peer (p2p) networks offer content distributors the prospect of further improved content delivery performance.

A problem that currently exists is that, when a user sends a content request to a content delivery network, the content data in the request (such as a content identifier indicating the content requested by the user) may be sensitive information (e.g., from the point-of-view of the user). Thus, the content request may include and reveal sensitive information about the user to entities connected to the content delivery network, when combined with the data associable to the user (such as the identity of a user's device or the identity of a user) included in the content request. However, to comply with the content request, the content delivery network requires at least some information to be revealed in order to fulfil the request.

Furthermore, in wireless communication, such as using cellular technology, new services and service levels are enabled, having more speed and throughput. A desire therefore exists to provide ways in which the content provider is able to efficiently share and manage content in different services provided for different users.

A further privacy problem is that the identity or location data of the content provider may be sensitive. This may be a particular issue in a p2p environment, where, in principle, any entity can join the network and provide content. Thus, when sending the content to the user, the content provider requires anonymization as the source of the content, but still needs to deliver the content to the user via the content delivery network.

There is therefore an increasing need for privacy protection for both the user and the content provider.

Systems and methods are provided herein for improving the privacy of entities involved in content distribution. For example, by using functional encryption to encrypt a user identifier and a content identifier, and providing functional decryption keys which enable discrete decryption of the user identifier and the content identifier, different entities may be provided with different functional decryption keys, such that entities are unable to determine both the user identifier and the content identifier. Furthermore, by incorporating a role of a distributor which mediates messages between a user and a content provider, anonymity between the content provider and the user can be preserved.

According to an example of the systems and methods described herein, a distributor (e.g., a distributor node) receives a functionally encrypted content request comprising a user identifier and a content identifier (e.g., both the user identifier and the content identifier are functionally encrypted). For example, a user node may send to the distributor a content request message comprising a user identifier and a content identifier, where the message (or at least the user identifier and the content identifier of the message) may be functionally encrypted. The functionally encrypted content request is sent to a content provider. For example, the distributor may forward the content request, or a message corresponding to the content request, to the content provider. The content request sent to the content provider may be different from the received content request. For example, the content request may be modified before being forwarded by the distributor to the content provider, or only a part of the received content request may be sent to the content provider. In this example, the distributor receives a content reply comprising the functionally encrypted content request (or part thereof) and encrypted content corresponding to the content identifier. In some examples, the content identifier has been resolved from the encrypted content request (e.g., at the content provider) by decrypting the content request using a functional content identifier decryption key. Thus, the content provider may identify the content to be sent in the content reply. In this example, the distributor decrypts the content reply using a functional user identifier decryption key to resolve the user identifier. The distributor sends a further (e.g., second) content reply, which corresponds to the content reply from the content provider, to a user node associated with the user identifier. In some examples, the further (second) content reply is the same as the (first) content reply. In other examples, the further content reply is different from the content reply.

In some examples, the distributor receives at least one functional user identifier decryption key. For example, the distributor may receive a functional user identifier decryption key from a key manager (e.g., a key service), which the distributor may use to resolve the user identifier.

In some examples, a transaction identifier may be received at the distributor along with the encrypted content request (e.g., may be received from the user node). The transaction identifier may be sent along with the encrypted content request from the distributor to the content provider. For example, a transaction identifier may be used to identify the various functional encryption keys and functional decryption keys which are required to resolve the content request (e.g., the transaction identifier may identify functional decryption keys corresponding to the functional encryption performed to encrypt the content request). In some examples, at the content provider, the content request is decrypted using a functional content identifier decryption key corresponding to the transaction identifier. In some examples, at the distributor, the content reply is decrypted using a user identifier decryption key corresponding to the transaction identifier.

In some examples, the content of the content reply is functionally encrypted (e.g., by the content provider), and a functional content decryption key is usable to resolve a part of the content. For example, a user node may be provided with a functional content decryption key which is able to resolve a content item from the content.

In some examples, the functional content decryption key corresponds to a precondition. For example, the precondition may relate to the user, such as a service level agreement corresponding to the user, and/or content distribution network (CDN) policy for devices, e.g., associated with the user, and/or a permission to access a network, and/or a permission to use resources/services (e.g., authorization).

In some examples, the functional content decryption key is quality specific. In some examples, the functional content decryption key is at least one of time-specific and memory space specific.

In some examples, a content distributor network acts as the distributor.

In some examples, the distributor receives an encrypted content response comprising the content reply and a contribution of the user. For example, the encrypted content response may be sent by the user (e.g., user node). In some examples, the encrypted content response is sent to the content provider. For example, the distributor may send the encrypted content response to the content provider, where the content provider may be able to decrypt the contribution of the user.

According to the systems and methods described herein, a user node sends a functionally encrypted content request, in some examples comprising a user identifier and a content identifier, to a distributor. The user node receives a content reply comprising encrypted content. The user node decrypts the encrypted content.

In some examples, the content is functionally encrypted, and the user node decrypts the content using a functional content decryption key. In some examples the functional content decryption key corresponds to a precondition.

In some examples, the user node receives a functionally encrypted content decryption key message comprising a plurality of functionally encrypted decryption keys. The user node decrypts the functionally encrypted content decryption key message to resolve a content decryption key. The user node uses the content decryption key to decrypt the content. For example, a key service may provide the content provider with a plurality of encryption keys for encrypting content. The key service may also provide the corresponding decryption keys to the user node, where the plurality of decryption keys are functionally encrypted. The user node may also be supplied, for example, by a license server, with a functional decryption key configured to decrypt at least one of the functionally encrypted keys, where the user node may then use the resolved decryption key to decrypt a part of the content sent from the content provider.

According to the systems and methods described herein, a user node sends a content item request to a distributor or cache memory. The user node receives a content reply comprising functionally encrypted content comprising a plurality of content items from the distributor or cache memory. The user node uses a functional decryption key to decrypt the content to resolve a content item.

In some examples, the user node sends a transaction identifier with the functionally encrypted user identifier and content identifier. The user node may encrypt the content request using a functional encryption key provided by a key service. The key service may additionally provide the transaction identifier along with the functional encryption key to the user node. The key service may additionally provide the same or a corresponding transaction identifier along with the functional content identifier decryption key sent to the content provider. The key service may additionally provide the same or a corresponding transaction identifier along with the functional user identifier decryption key sent to the distributor.

In some examples, a plurality of content decryption keys for decrypting the content are functionally encrypted, and a functional decryption key is usable to resolve at least one of the plurality of content decryption keys. For example, the content provider may encrypt the content using a plurality of content encryption keys, the plurality of content encryption keys may be functionally encrypted and sent to the user node (directly or indirectly), and the user node may be provided with a functional decryption key which is able to resolve one of the content decryption keys, where the content decryption key is then able to resolve a content item from the encrypted content. A key manager may send the functional encryption key to the content provider to encrypt the keys, and may send a functional decryption key to the user node to decrypt at least one key.

According to the systems and methods described herein, a content provider receives a content request comprising a functionally encrypted user identifier and a content identifier. The content provider decrypts the content request using a functional content identifier decryption key to resolve the content identifier. The content provider uses the content identifier to determine or select the content to send to the user, then the content provider encrypts the content using a content encryption key. The content provider then sends a content reply comprising the content request and the encrypted content to the distributor.

According to the systems and methods described herein, a system is provided comprising any, or any combination of, the content provider, the distributor, the user node, and the key manager.

According to the systems and methods described herein, a plurality of content is stored in a storage, for example, of a distributor or a cache, where the plurality of content is functionally encrypted. A request from a user node is received for the plurality of content at the distributor or cache. The plurality of content is then sent to the user node. The user node is able to resolve a content item from the plurality of content based on a functional decryption key.

According to the systems and methods described herein, a key manager receives a request for a functional encryption key from a user node. The key manager creates a functional encryption key, a functional user identifier decryption key, and a functional content identifier decryption key based on a master key. The key manager sends the functional encryption key to the user node. The key manager sends the functional user identifier decryption key to the distributor. The key manager sends the functional content identifier decryption key to the content provider.

According to the systems and methods described herein, a distributor receives a functionally encrypted content request. The distributor sends the functionally encrypted content request to a content provider. The distributor receives a content reply comprising the functionally encrypted content request and encrypted content. The distributor identifies the identity of a user who has made the request by decrypting the content request using a functional content identifier decryption key. The distributor sends a further content reply to the user.

According to the systems and methods described herein, a user node sends a functionally encrypted content request comprising a user identifier and a content identifier to a distributor. The user node receives a content reply comprising encrypted content. The user node decrypts the content in the content reply using a content decryption key.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 3 is a flowchart representing a process at a distributor for content delivery, in accordance with some examples of the disclosure;

FIG. 7 is a flowchart representing a process for content distribution, in accordance with some examples of the disclosure;

DETAILED DESCRIPTION

Figure 1:
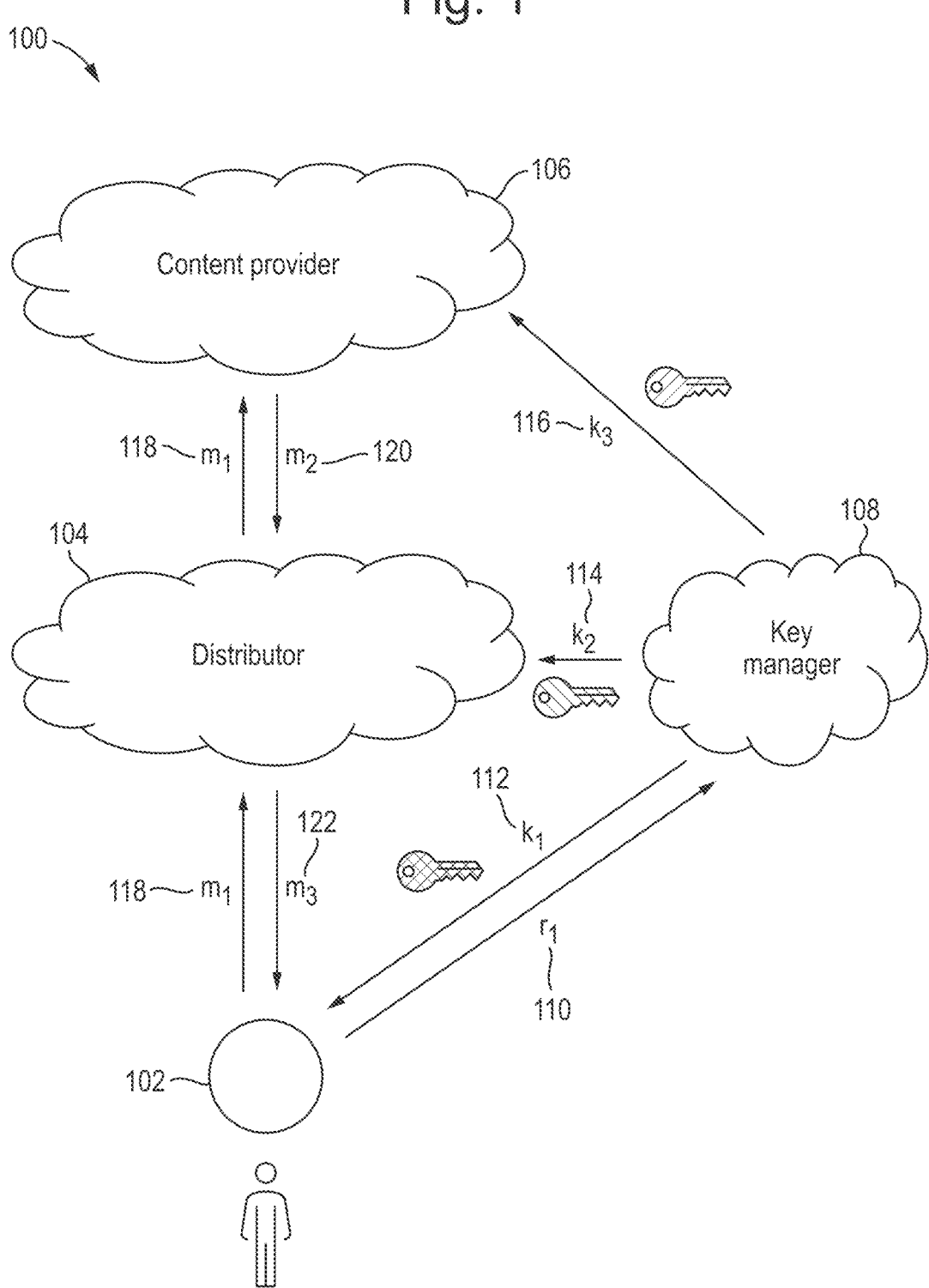
FIG. 1 illustrates an overview of the system for content delivery, in accordance with some examples of the disclosure.

Peer-to-peer file sharing has been employed for use in the distribution of open-source operating systems, media, and/or software packages. The provision of such files or data via peer-to-peer file sharing such as BitTorrent or similar may expedite the propagation and availability of such files in a decentralized environment. Peer-to-peer file sharing has been employed in such a context for ease and speed of distribution, however, there has historically been little need for file security or encryption due to the nature of the content being shared. With a widening scope of application for peer-to-peer file sharing, it is desirable that the processes involved enable privacy for the entities involved.

In particular, a content provider (who may be a party possessing and providing the content via a content delivery network (CDN) using encryption and encoding) may vary in terms of contributor, e.g., content may be provided not only by commercial companies, but also by authorities, researchers, and citizens alike. This development in the application of peer-to-peer file sharing emphasizes the need for privacy protection for both the user (e.g., the person or entity requesting the content) and the content provider. Examples of situations in which it is desirable to improve privacy for both a user and a content provider are where a user wishes to request sensitive content from the content provider, or where a private company wishes to share sensitive business information for AI development to a 3rd party, where both cases require anonymization.

Thus, as a part of a content delivery service, it is desirable that a user is able to operate with the knowledge that any information regarding content submissions remains secret to the parties handling their data, and it is further desirable that the content provider is able to operate with the knowledge that the content provided will only be accessed by the user.

As will be discussed below, the methods and systems described herein provide ways in which the privacy of the user and content provider can be improved.

In examples herein, parties that may be involved in content distribution are a user node (e.g., a user device, or a device through which a user makes a content request), a content provider node (e.g., a party that stores the content, and receives the content request and provides content to the user), and a distributor node (e.g., a party that mediates the content request to the content provider, and mediates the content associated with the content request to the user, and in some examples a party that has suitable functional key(s) to obtain a user ID, and the ability to distribute a content request and encrypted content), which may be a server or a plurality of servers. In some examples, a key manager node is also provided, which is a party that is located in a trusted environment isolated from the rest of the system. The content provider, distributor, and user may communicate using a peer-to-peer (P2P) network, which may be referred to herein as a content delivery network. As used herein, a user is an end user, who initiates and transmits the content request to the content provider via the distributor and similarly, receives content from the content provider via the distributor. The addition of a distributor and/or a key manager (e.g., the use of functional encryption, and the user of functional encryption/decryption keys) in the processes of content delivery system enables enhanced privacy for entities involved with the content distribution.

As will be described in relation to FIG. 1 below, these entities may operate as part of a content delivery network to provide content to users. As referred to herein, the terms "content items" and "content" should each be understood to mean an electronically consumable user asset, such as television programming, as well as pay-per-view programs, on-demand programs (as in video-on-demand (VOD) systems), Internet content (e.g., streaming content, downloadable content, Webcasts, etc.), video content, audio content, audio-video content, other multimedia content, advertisements, electronic newspapers or other text-based content, audio book content, video games, e-commerce goods or services, software licenses, computer-executable programs or applications, content information, pictures, rotating images, documents, playlists, websites, articles, books, electronic books, blogs, chat sessions, social media, applications, games, and/or any other media or multimedia and/or combination of the same. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

FIG. 1 illustrates an overview of a system 100 for content distribution, such as audio-video content distribution. In particular, the example shown in FIG. 1 illustrates a system 100 comprising entities of a user node 102, a distributor 104, a content provider 106, and a key manager 108. The entities are in communication via a content delivery network (not shown). The content provider 106, the key manager 108, and the distributor 104, may be considered to form part of a content management network, or a content delivery network. It will be appreciated that a content delivery network may comprise other entities which are not illustrated in FIG. 1.

In an initial stage, encryption keys for the encryption and decryption of data are provided to the relevant entities. In particular, the user node 102 requests from the key manager 108 (e.g., a key service), a functional encryption key in request message $r_1$ 110. A functional encryption key as referred to herein may be considered to be a key enabling the encryption of a set of data in a functional encryption setting. The key manager 108 of this example comprises a master key (e.g., a key enabling the creation of functional decryption key(s) and the related function(s), in a functional encryption setting, where a function is used to query the encrypted data for particular information, resulting, when used in combination with a functional decryption key corresponding to that information, in a cleartext result (e.g., of the information) restricted by the function space). In response to receiving the request $r_1$ from the user node 102, the key manager 108 creates a functional encryption key, a functional user identifier decryption key, and a functional content identifier decryption key. As used herein, the term "functional decryption key" may be taken to be a key enabling the decryption of a set of functionally encrypted data, restricted by the functional space. For example, where the functional decryption key is a functional content identifier decryption key, only the content identifier may be resolved from the encrypted data using the functional content identifier decryption key. Where the functional decryption key is a functional user identifier decryption key, only the user identifier may be resolved from the encrypted data using the functional user identifier decryption key. As used herein, the term "content identifier (ID)" may be taken to mean an identifier unambiguously associated with the submittable content, and the term "user identifier (ID)" may be taken to mean an identifier unambiguously associable with the user and usable to resolve the user's identity, such as a user's username within a particular system. The user identifier may also be used to identify a user node which is used by, or associated with, the user, through which the user is communicating with other entities. Similarly, a "device identifier (ID)" may be taken to mean an identifier unambiguously associated with the user's device.

The key manager 108 then sends to the user node in message $k_1$ 112 the functional encryption key along with a transaction ID (T). The transaction ID is used to identify a particular transaction, so that the correct corresponding functional keys can be used by each entity, particularly in the case where multiple transactions occur simultaneously, however, it will be appreciated that the transaction ID may not be necessary, for example, in a case of a single transaction, or where each entire transaction occurs sequentially. The transaction ID may be taken to be a Tag (e.g., Message Authentication Code) attachable to a content request. The key manager 108 also sends to the distributor 104 a message $k_2$ 114 comprising the functional user identifier decryption key and transaction ID, and the key manager 108 sends to the content provider 106 message $k_3$ 116 comprising the functional content identifier decryption key and transaction ID.

While the example of FIG. 1 illustrates the distribution of keys by a key manager 108, it will be appreciated that in some examples, it will be assumed that the relevant entities, such as the content provider 106, the distributor 104, and the user node 102, are already in possession of the necessary keys for performing the methods as described herein.

When the user node 102 wishes to request content, the user node 102 creates a content request comprising the transaction ID, a user identifier (corresponding to the user node) and a content identifier (corresponding to the content desired by the user node). The user node 102 then encrypts (using the functional encryption key) the data comprising the user identifier and the content identifier, such that this data is functionally encrypted. The user node 102 then sends a content request $m_1$ 118 comprising the functionally encrypted user identifier and content identifier, and the transaction ID, to the distributor 104.

Upon reception of the content request from the user node 102, the distributor 104 forwards the content request $m_1$ 118 to the content provider 106. In some examples, prior to sending the content request $m_1$ 118 to the content provider 106, the distributor 104 resolves the identity of the user using the received functional user identifier decryption key.

The content provider 106 then decrypts the content request using the functional content identifier decryption key (e.g., corresponding to the transaction ID) to resolve the content identifier. The content provider 106 then encrypts content corresponding to the content identifier using a content encryption key, and then sends the content request along with the encrypted content to the distributor 104 in a content reply message $m_2$ 120.

The distributor 104 then decrypts the content reply message $m_2$ using the functional user identifier decryption key (e.g., corresponding to the transaction ID) to resolve a user identifier, and sends message $m_3$ 122 comprising the content request along with the encrypted content to the user node 102 (e.g., to a user node corresponding to the user identifier). In some examples, the message $m_3$ sent to the user node 102 from the distributor 104 comprises instead the resolved user identifier, along with the encrypted content.

The user node 102 then decrypts the content, the user node 102 having been supplied with a content decryption key (e.g., by a license server, who provides the content provider 106 with a content encryption key, and the user node 102 with a content decryption key).

Where reference is made herein to a "user", it will be appreciated that a "user" may be an end user, and may make requests and receive messages through a user node, such as a user device. The terms "user", "user node" and "user device" may be used interchangeably throughout.

As is noted above, a content delivery network may comprise the distributor, and/or may form part of the chain of communication between the user and the content provider. For example, a content delivery network, such as a DRM API, may also comprise any, or any combination of, a license server which is a party providing the content encryption key (CEK) (e.g., to the content provider) and manages the license verification for the content, a user initializing the content request (e.g., by authenticating to the service) with a user node (e.g., user device), a content decryption module (CDM) which handles the decryption of the content (e.g., at the user node), and a device, which may be a platform, CDM, and/or browser with related applications (e.g., which negotiates with the License server), which sends the content request to the CDN.

Figure 2:
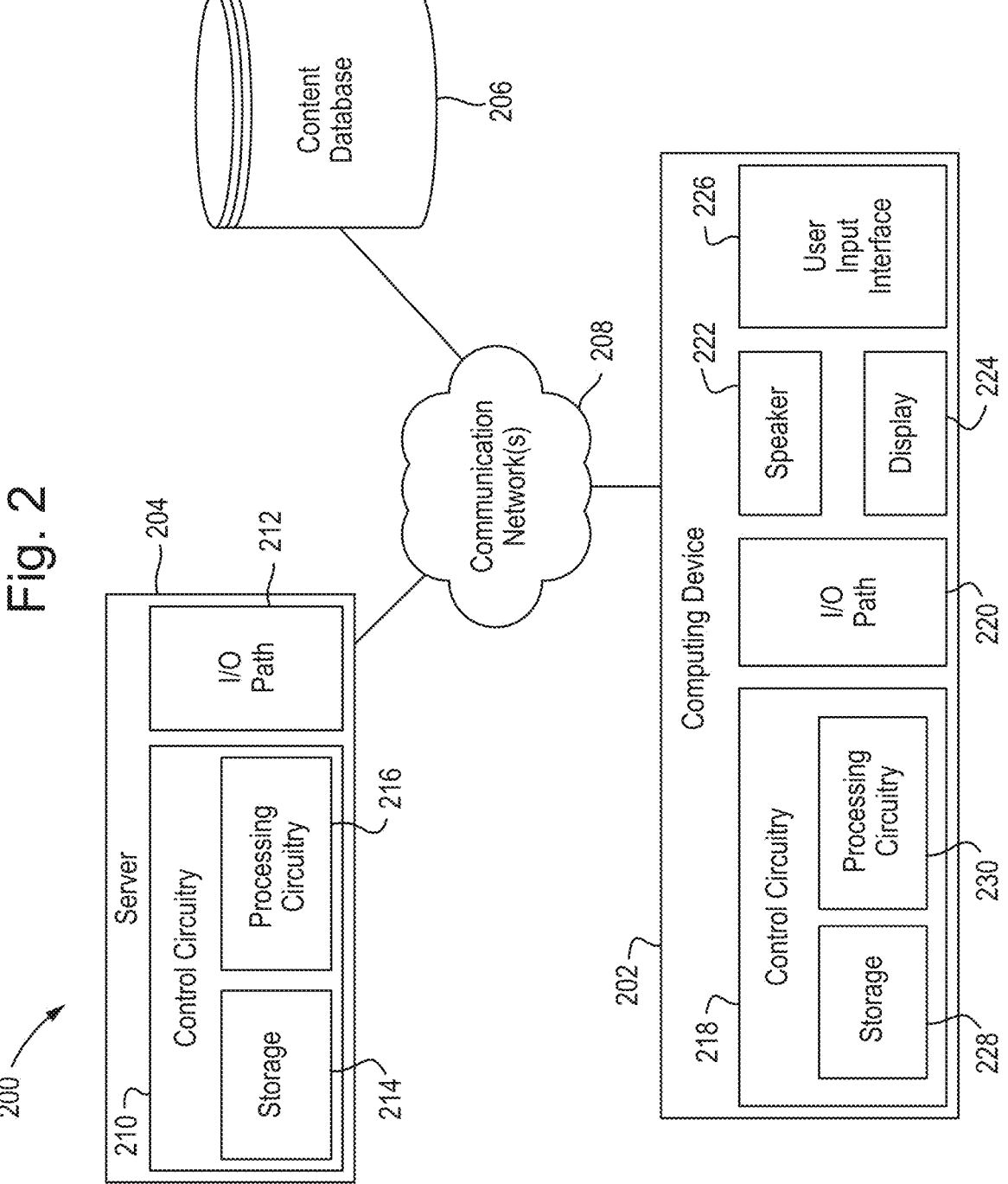
FIG. 2 is a block diagram showing components of an example system for content delivery, in accordance with some examples of the disclosure.

FIG. 2 is an illustrative block diagram showing example system 200, e.g., a non-transitory computer-readable medium, configured to distribute content, such as audio-video content. Although FIG. 2 shows system 200 as including a number and configuration of individual components, in some examples, any number of the components of system 200 may be combined and/or integrated as one device, e.g., as user node 102, distributor 104, content provider 106, and key manager 108. System 200 includes computing device n-202 (denoting any appropriate number of computing devices, such as user mode 102, distributor 104, content provider 106, and/or key manager 108), server n-204 (denoting any appropriate number of servers, such as distributor 104, content provider 106, and/or key manager 108), and one or more content databases n-206 (denoting any appropriate number of content databases), each of which is communicatively coupled to communication network 208, which may be the Internet or any other suitable network or group of networks, such as a content distribution network or content management network. In some examples, system 200 excludes server n-204, and functionality that would otherwise be implemented by server n-204 is instead implemented by other components of system 200, such as computing device n-202. For example, computing device n-202 may implement some or all of the functionality of server n-204, allowing computing device n-202 to communicate directly with content database n-206. In still other examples, server n-204 works in conjunction with computing device n-202 to implement certain functionality described herein in a distributed or cooperative manner.

Server n-204 includes control circuitry 210 and input/output (hereinafter "I/O") path 212, and control circuitry 210 includes storage 214 and processing circuitry 216. Computing device n-202, which may be an HMD, a personal computer, a laptop computer, a tablet computer, a smartphone, a smart television, or any other type of computing device, includes control circuitry 218, I/O path 220, speaker 222, display 224, and user input interface 226. Control circuitry 218 includes storage 228 and processing circuitry 220. Control circuitry 210 and/or 218 may be based on any suitable processing circuitry such as processing circuitry 216 and/or 230. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some examples, processing circuitry may be distributed across multiple separate processors, for example, multiple of the same type of processors (e.g., two Intel Core i9 processors) or multiple different processors (e.g., an Intel Core i7 processor and an Intel Core i9 processor).

Each of storage 214, 228, and/or storages of other components of system 200 (e.g., storages of content database 206, and/or the like) may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 2D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Each of storage 214, 228, and/or storages of other components of system 200 may be used to store various types of content, metadata, and or other types of data. Non-volatile memory may also be used (e.g., to launch a boot-up routine and other instructions). Cloud-based storage may be used to supplement storages 214, 228 or instead of storages 214, 228. In some examples, control circuitry 210 and/or 218 executes instructions for an application stored in memory (e.g., storage 214 and/or 228). Specifically, control circuitry 210 and/or 218 may be instructed by the application to perform the functions discussed herein. In some implementations, any action performed by control circuitry 210 and/or 218 may be based on instructions received from the application. For example, the application may be implemented as software or a set of executable instructions that may be stored in storage 214 and/or 228 and executed by control circuitry 210 and/or 218. In some examples, the application may be a client/server application where only a client application resides on computing device n-202, and a server application resides on server n-204.

The application may be implemented using any suitable architecture. For example, it may be a stand-alone application wholly implemented on computing device n-202. In such an approach, instructions for the application are stored locally (e.g., in storage 228), and data for use by the application is downloaded on a periodic basis (e.g., from an out-of-band feed, from an Internet resource, or using another suitable approach). Control circuitry 218 may retrieve instructions for the application from storage 228 and process the instructions to perform the functionality described herein. Based on the processed instructions, control circuitry 218 may determine what action to perform when input is received from user input interface 226.

In client/server-based examples, control circuitry 218 may include communication circuitry suitable for communicating with an application server (e.g., server n-204) or other networks or servers. The instructions for carrying out the functionality described herein may be stored on the application server. Communication circuitry may include a cable modem, an Ethernet card, or a wireless modem for communication with other equipment, or any other suitable communication circuitry. Such communication may involve the Internet or any other suitable communication networks or paths (e.g., communication network 208). In another example of a client/server-based application, control circuitry 218 runs a web browser that interprets web pages provided by a remote server (e.g., server n-204). For example, the remote server may store the instructions for the application in a storage device. The remote server may process the stored instructions using circuitry (e.g., control circuitry 210) and/or generate displays. Computing device n-202 may receive the displays generated by the remote server and may display the content of the displays locally via display 224. This way, the processing of the instructions is performed remotely (e.g., by server n-204) while the resulting displays are provided locally on computing device n-202. Computing device n-202 may receive inputs from the user via input interface 226 and transmit those inputs to the remote server for processing and generating the corresponding displays.

A computing device n-202 may send instructions, e.g., to request content, to control circuitry 210 and/or 218 using user input interface 226.

User input interface 226 may be any suitable user interface, such as a remote control, trackball, keypad, keyboard, touchscreen, touchpad, stylus input, joystick, voice recognition interface, gaming controller, or other user input interfaces. User input interface 226 may be integrated with or combined with display 224, which may be a monitor, a television, a liquid crystal display (LCD), an electronic ink display, or any other equipment suitable for displaying visual images.

Server n-204 and computing device n-202 may transmit and receive content and data via I/O path 212 and 220, respectively. For instance, I/O path 212, and/or I/O path 220 may include a communication port(s) configured to transmit and/or receive (for instance to and/or from content database n-206), via communication network 208, content item identifiers, content metadata, natural language queries, and/or other data. Control circuitry 210 and/or 218 may be used to send and receive commands, requests, and other suitable data using I/O paths 212 and/or 220.

FIG. 3 shows a flowchart representing an illustrative process 300 for content distribution, such as that performed by the distributor 104 of the system 100 shown in FIG. 1. While the example shown in FIG. 3 refers to the use of system 100, as shown in FIG. 1, it will be appreciated that the illustrative process 300 shown in FIG. 3 may be implemented, in whole or in part, on system 100, system 200, and/or any other appropriately configured system architecture. For the avoidance of doubt, the term "control circuitry" used in the below description applies broadly to the control circuitry outlined above with reference to FIG. 2. For example, control circuitry may comprise control circuitry of user node 102, control circuitry of the distributor 104, control circuitry of the content provider 106, and control circuitry of the key manager 108, working either alone or in some combination.

At block 302, control circuitry, for example control circuitry of the distributor 104, receives a functionally encrypted content request comprising a user identifier and a content identifier. The functionally encrypted content request may be received from a user node 102. In some examples, the encrypted content request additionally comprises a transaction identifier.

At block 304, control circuitry, for example control circuitry of the distributor 104, sends the functionally encrypted content request, or a message corresponding to the functionally encrypted content request, to a content provider 106. In some examples, prior to the sending of the functionally encrypted content request to the content provider 106, the distributor 104 may decrypt the content reply using a functional user identifier decryption key to resolve the user identifier. In some examples, the functional user identifier decryption key is selected based on the transaction identifier, where the transaction identifier indicates which functional user identifier decryption key corresponds to the particular functional encryption of the encrypted content request.

At block 306, control circuitry, for example control circuitry of the distributor 104, receives a content reply comprising the functionally encrypted content request and encrypted content corresponding to the content identifier. The content identifier may have been resolved from the encrypted content request by decrypting the content request using a functional content identifier decryption key at the content provider 106, whereby the content provider 106 can then identify the content to send, and encrypt the content using a content encryption key. In some examples, the content reply comprises a transaction identifier.

At block 308, control circuitry, for example control circuitry of the distributor 104, decrypts the content reply using a functional user identifier decryption key to resolve the user identifier. Thus, the distributor may identify a user to whom the content should be sent. In some examples, the functional user identifier decryption key to use to resolve the user identifier may be selected based on the transaction identifier.

At block 310, control circuitry, for example control circuitry of the distributor 104, sends a further content reply corresponding to the content reply to a user node 102 corresponding to the user identifier. In some examples, the further content reply is the same as the content reply received at the distributor 104. In other examples, the further content reply comprises the resolved user identifier along with the encrypted content. In some examples, the further content reply comprises the transaction identifier.

In some examples, the distributor 104 (e.g., control circuitry of the distributor 104) may receive at least one functional user identifier decryption key. For example, a key service 108 may provide a functional user identifier decryption key to the distributor 104 (and in some examples, a transaction identifier) so that the distributor 104 may determine the user's identity during a transaction.

In some examples, the content of the content reply is functionally encrypted, where a functional content decryption key may be used to resolve a part of the content. Such a key may be provided to the user node 102 (e.g., by the key manager or by a license server) so that the user may decrypt the content. In particular, by functionally encrypting the content, only a portion of the content may be decrypted by a user node, based on a precondition. A precondition may be, for example, particular quality of service that corresponds to the user, such as a quality of service agreement. The functional content decryption key may therefore only decrypt content corresponding to the particular content defined in the terms of the agreement (e.g., that conforms to the precondition).

In some examples, the distributor 104 is a part of a content distribution network. A content distribution network may be considered to be a network, or a part of a network, that enables communication between the entities such as the content provider 106, the distributor 104, and the user node 102. In some examples, the content distributor network acts as the distributor as described herein. For example, the distributor may not be a designated entity within the content distribution network, instead, the content distribution network may itself function as the distributor, such as by storing messages in a cache which is accessible by the user node and the content provider (e.g., the content provider and user node may send messages to and access messages from the cache).

In some examples, after receiving the content at the user node, the user may wish to add to the content. The user may therefore add their addition to the content, the user node 102 may encrypt the content using the functional encryption key, and the user node 102 may then send a content response comprising the newly encrypted content to the distributor 104.

In some examples, the distributor 104 thus further receives the encrypted content response comprising the content reply and a contribution of the user, and sends the encrypted content response to the content provider. The content provider 106 may then decrypt the content response using a functional content decryption key to resolve the content and the addition added by the user (in some cases, the content is content modified by the user). The functional encryption used to encrypt the content and the addition may be different to the encryption used by the user node to encrypt the request message, where the user node may be provided with a functional encryption key and the content provider with a functional decryption key by, for example, the key service.

As is discussed above, the role of the distributor enables messages to be passed between the user and the content provider without the content provider knowing the identity of the user, and prevents the requested content from being exposed to entities other than the user node. The inclusion of a distributor which performs the method described in relation to FIG. 3 therefore advantageously improves the privacy of both the content distributor and the user.

In some examples, a plurality of content decryption keys for decrypting the content are functionally encrypted, for example, at the content provider 106. For example, the content provider may encrypt the content using a plurality of content encryption keys, the plurality of content encryption keys may be functionally encrypted and sent to the user node (directly or indirectly), and the user node may be provided with a functional decryption key which is able to resolve one (or more) of the content decryption keys, where the resolved content decryption key is then able to resolve a content item from the encrypted content. A key manager may send the functional encryption key to the content provider to encrypt the keys, and may send a functional decryption key to the user node to decrypt at least one key. In some examples, the content decryption key is time-specific or memory specific.

As is described herein, the messages sent between entities are in some cases functionally encrypted. Functional encryption is a generalization of public key encryption, where a secret key enables a user to learn a function of what a ciphertext is encrypting. In particular, functional encryption may be used to encrypt information so that different keys enable different parts of the information to be decrypted. An example of functional encryption is illustrated in FIG. 4, in particular, in relation to restricted access to encrypted data in the cloud.

Figures 4, 5A:
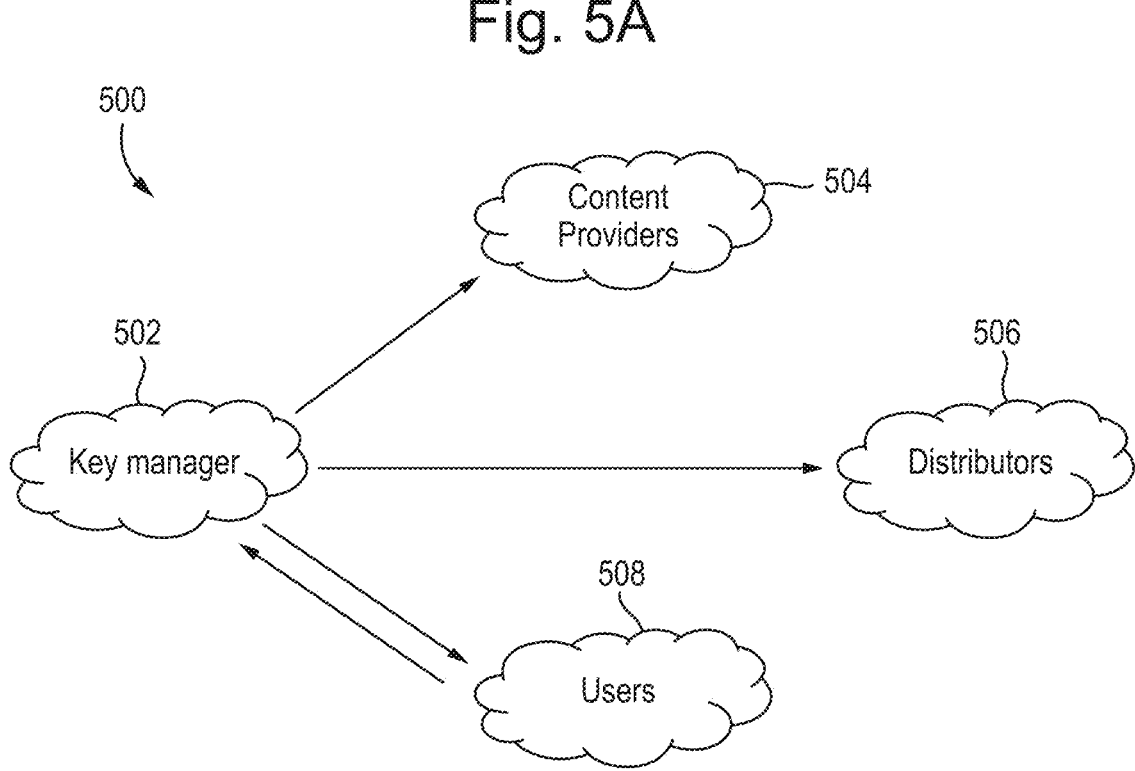
FIG. 4 illustrates a process of functional encryption, in accordance with some examples of the disclosure.
FIGS. 5A and 5B illustrate functional key distribution between entities, in accordance with some examples of the disclosure.

FIG. 4 illustrates a system 400 comprising a first user (Alice) 402 at a first user node and a second user (Bob) 404 at a second user node in communication with a cloud communications network 406. Alice 402 may be a data owner, user node, content provider, or distributor, and encrypts data or message m with a (function specific) public key (pk) (e.g., a functional encryption key), using encryption function f( ) the processing of which results in ciphertext c (c=f(m,pk)). (Alice's public key has been generated and sent to Alice by a trusted party, Charlie (e.g., a key manager).) Alice then sends the ciphertext c to cloud storage of the cloud communication network 406. Bob 404 wishes to perform calculations f' on the ciphertext, so Bob 404 uses secret (private) key sk[f'( )] (indexed by function f') (e.g., a functional decryption key), such that decrypting the ciphertext c will produce as a result "x" (not m, as would a normal public key decryption algorithm). (Bob's secret key has been generated and sent to Bob by Charlie.) Bob 404 passes the function f'( ) and the secret (private) key executed for that function sk[f'( )] to the cloud 406. Bob receives the output x (x=f(c, f' ( ) sk[f'( )])) for the operation of function f'( ) on the encrypted data c. Thus, the benefit of functional encryption is that it reveals only partial information "x" regarding message m.

FIG. 4 illustrates an example in which the cloud communications network 406 acts as an intermediary between Alice 402 and Bob 404. In the system 100 illustrated in FIG. 1, a further actor is introduced in the role of the distributor 104. Advantageously, by incorporating a further layer of functionality, and through the use of functional encryption, an additional level of privacy and anonymity is provided for the user, and in some embodiments, for the content provider. In particular, according to processes described herein, no single party, actor, or node can combine or resolve the data relating to the identity of the user with data on the content that the user is requesting.

Thus, functional encryption may be advantageously applied in both a content requesting process and a content receiving process where actors are users, distributors and content providers. By providing different functional decryption keys, one which is able to resolve the user, and one which is able to resolve content, neither the distributor nor the content provider are able to associate the requested and delivered content with the user.

As is illustrated in FIG. 1, keys required to perform the encryption and decryption at the various stages may be provided by a key service (e.g., a key manager). In particular, a key service may hold the master key, and an associated functional encryption key may be provided to the user node.

With the master key and relevant function(s), the key service may create associated functional decryption keys for a distributor, who may then use a functional decryption key able to resolve the identity of the user, and a content provider, who may then use a functional decryption key to resolve the identity of content requested, where the keys are associated with a particular function.

FIG. 5A illustrates a system 500 for key distribution according to an example. In particular, FIG. 5A illustrates a key manager 502, a content provider 504, a distributor 506, and a user 508, where the key manager 502 distributes keys to the relevant entities.

The process of key transfer begins with a user node 508 requesting a functional encryption key from the key manager 502. For example, a user may request from a streaming platform particular content that they wish to view. The user node 508 may, in response, send a request for a functional encryption key to a key manager 502 so that the user node 508 can encrypt a content request.

In response to receiving the functional encryption key request from the user node 508, the key manager 502 creates a functional encryption key $k_F(k_u, k_c)$ and a master key. The key manager additionally creates a functional content identifier decryption key $k_c$ and a functional user identifier decryption key $k_u$. A transaction identifier (ID) T is also created to enable the entities to identify the correct functional key to use (e.g., one corresponding to the functional encryption used to encrypt the data).

The functional encryption key $k_F$ and a transaction ID T corresponding to the functional encryption key are then sent from the key manager 502 to the user node 508. Additionally, the key manager 502 sends the functional content identifier decryption key $k_c$ and the transaction ID T to the content provider 504. The key manager 502 also sends the functional user identifier decryption key $k_u$ and the transaction ID T to the distributor 506.

Figure 5B:
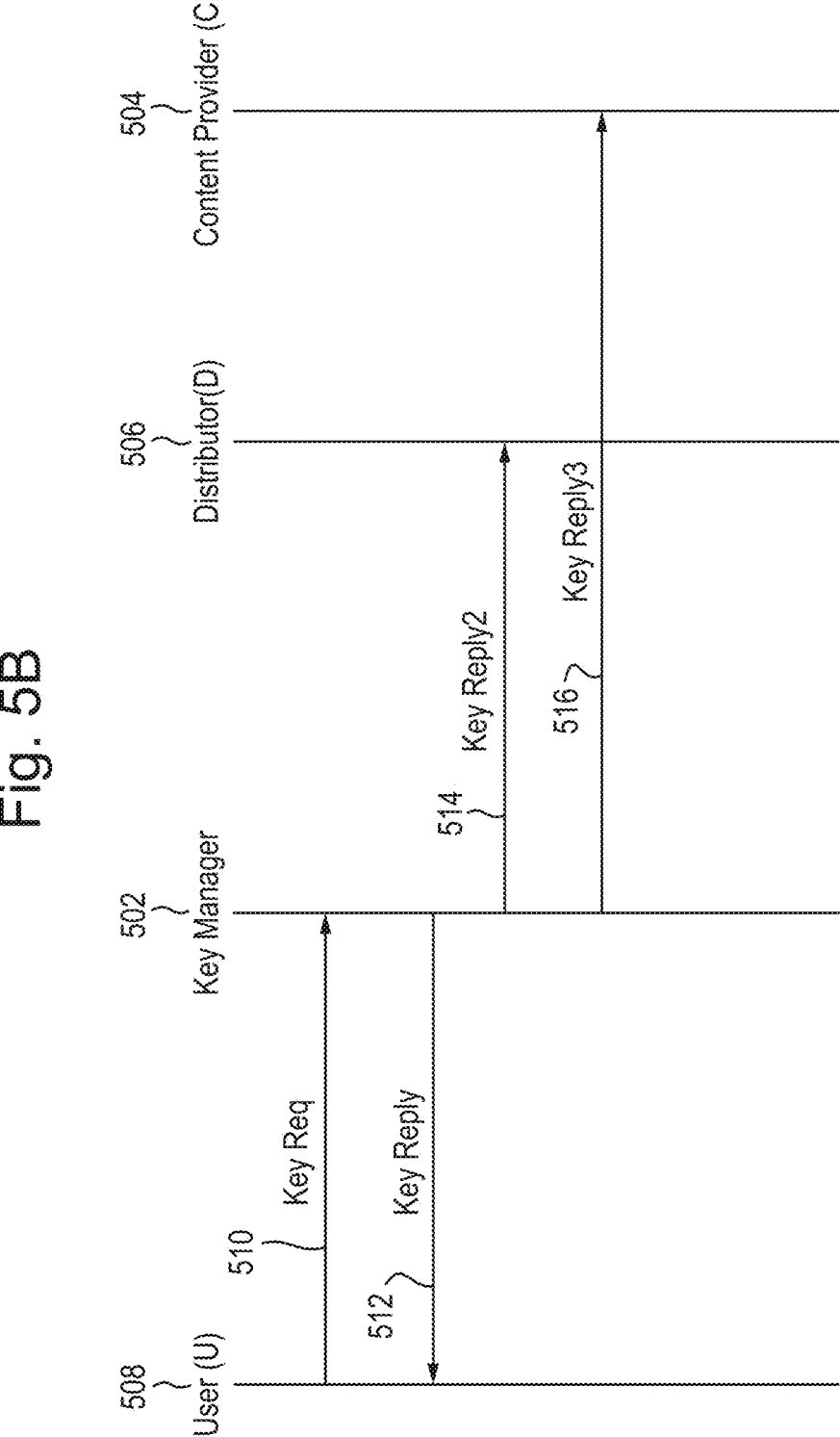

FIG. 5B further illustrates the sequence of key distribution between the entities illustrated in FIG. 5A.

A user node 508 requests a functional encryption key from the key manager 502, illustrated here as key request 510.

As is described above, in response to receiving the request, the key manager creates a functional encryption key $k_F(k_u, k_c)$ and a master key. The key manager additionally creates a functional content identifier decryption key $k_c$ and a functional user identifier decryption key $k_u$. A transaction identifier (ID) T is also created to enable the entities to identify the correct functional key to use.

Then, the functional encryption key $k_F$ and a transaction ID T corresponding to the functional encryption key are sent from the key manager 502 to the user 508, shown here as key reply 1 512.

The key manager 502 then sends the functional user identifier decryption key $k_u$ and the transaction ID T to the distributor 506, shown here as key reply 2 514.

The key manager 502 also sends the functional content identifier decryption key $k_c$ and the transaction ID T to the content provider 504, illustrated here as key reply 3 516.

In some examples, the key manager 502 is in communication with a plurality of users, and/or a plurality of distributors, and/or a plurality of content providers. The transaction ID which is sent by the key manager enables the entities to identify which of their functional decryption keys correspond to the functional encryption used to encrypt the particular content request of the current transaction, thereby enabling partial decryption of the content request by each of the distributor and the content provider.

By using separate key management, the use of functional encryption may be enabled, as well as the prevention of entities obtaining the knowledge of both the identity of the user and the identity of the requested content. Key management also allows one-time functional decryption key usage for the distributor and content provider for any content request, which prevents excess data storage.

Figures 6A, 6B:
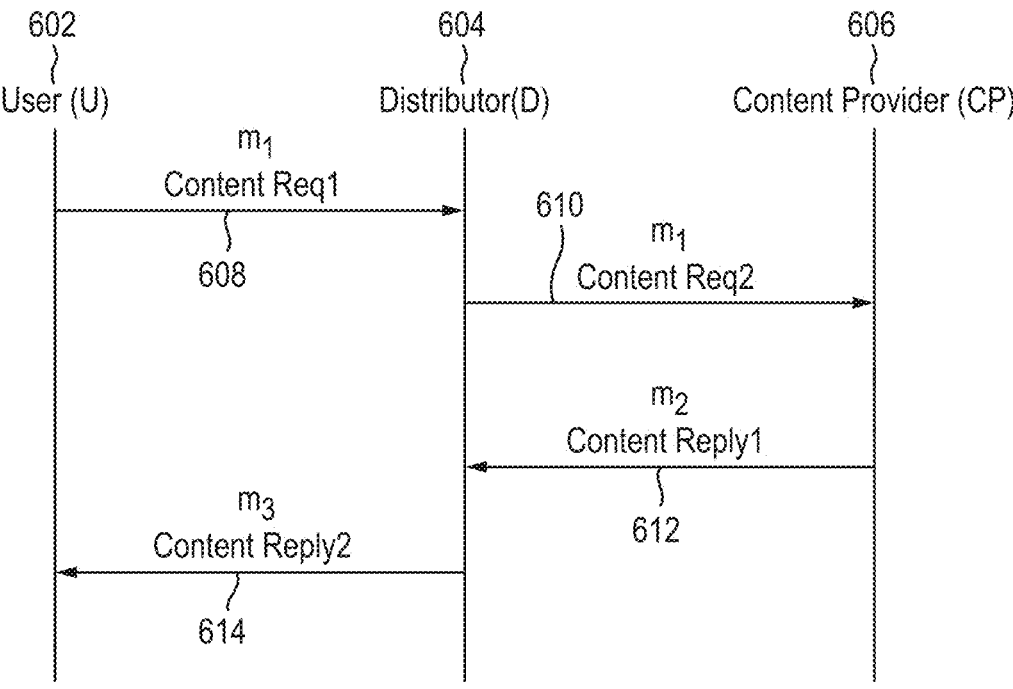
FIGS. 6A and 6B illustrate a process of content distribution, in accordance with some examples of the disclosure.

FIG. 6A illustrates a system 600 for requesting and receiving content between the entities of the user node 602, distributor 604, and content provider 606. As is described above, prior to the process outlined in FIG. 6A, a key manager (e.g., key service) has created and distributed a functional encryption key $k_F(k_u, k_c)$ and a transaction ID to a user node, responsive to receiving from the user node a request for a functional encryption key. Then, the key manager distributes a functional user identifier decryption key (and a transaction ID) to the distributor, and a functional content identifier decryption key (and a transaction ID) to the content provider. Therefore, the following assumes that the entities of the content provider, distributor, and user node are in possession of the required keys for performing the following processes.

To send a content request from the user node, the user node functionally encrypts a user identifier (or user device, or user node, identifier) and a content identifier. Equation 1 outlines this encryption process, $$\text{Encrypt: } f_1 = Enc(k_U(\text{User } ID), k_c(\text{Content } ID)) \qquad 1$$

where $f$ is a functional encryption function, Enc is encryption, $k_U$ is a functional user identifier decryption key, $k_c$ is a functional content identifier decryption key. The user node then creates and sends a content request message $m_1$, comprising the functionally encrypted user identifier and content identifier $f_1$, and further comprising a transaction ID T, identifying the current transaction, as shown in equation 2 below.

$$m_1 = (f_1, T) \qquad 2$$

Preconditions (e.g., a condition which is required to be satisfied in order for the process to be performed) of the creation of the message comprise a functional encryption key=$k_F(k_U, k_c)$ and a "Transaction ID" (e.g., received from the key manager). In particular, the transaction ID corresponds to the particular functional encryption key that is used to encrypt the message. The transaction ID advantageously enables the corresponding keys required for decryption of the message to be identified independent of the knowledge of the identity of the content or the identity of the user.

Upon receiving the message $m_1$, the distributor then decrypts (Dec) the message using a functional user identifier decryption key corresponding to the transaction ID to resolve the user identifier, as is shown in equation 3.

$$Dec(f_1) \leftarrow \text{"User } ID\text{"} \qquad 3$$

Preconditions of the decryption are the functional user identifier decryption key, and the transaction ID, which is used to identify the functional user identifier decryption key to use to decrypt the user ID. It will be appreciated that the step of identifying the user at this stage may be optional, where instead, or additionally, the identity of the user may be determined later (as will be described below). The distributor then forwards the message $m_1$ to the content provider.

Upon receiving the message $m_1$, the content provider decrypts the message using a functional content identifier decryption key corresponding to the transaction ID as is shown in equation 4 to determine the content identifier.

$$Dec(f_1) \leftarrow \text{"Content } ID\text{"} \qquad 4$$

Preconditions of the decryption are the functional content identifier decryption key, and the transaction ID.

The content provider then encrypts, using a content encryption key $k_{CEK}$, content corresponding to the content identifier, as is shown in equation 5.

$$Enc(k_{CEK}(\text{Content})) \qquad 5$$

A precondition of the encryption is the content encryption key $k_{CEK}$. Then, the content provider creates and sends a content reply message $m_2$, which comprises the information of message $m_1$ ($f_1$, T) along with the encrypted content, illustrated in equation 6.

$$m_2 = (f_1, Enc(k_{CEK}(\text{Content}), T) \qquad 6$$

Upon receiving the content reply message $m_2$, the distributor decrypts the message using a functional user identifier decryption key corresponding to the transaction ID T, as is shown in equation 7, to determine the user identifier.

$$Dec(f_1) \leftarrow \text{"User } ID\text{"}, T \qquad 7$$

Then, the distributor creates and sends a second content reply message $m_3$, comprising the user identifier and the encrypted content received from the content provider. This is illustrated in equation 8.

$$m_3 = (\text{User } ID, Enc(k_{CEK}(\text{Content})) \qquad 8$$

A precondition of the decrypting of the message $m_2$ is the functional user ID decryption key $k_U$, and the transaction identifier T.

Upon receiving the message $m_3$, the user node decrypts the message $m_3$ using a content decryption key (e.g., received from a license server, for example) to resolve the content, as is shown in equation 9.

$$Dec(m_3) \leftarrow \text{"Content"} \qquad 9$$

A precondition of the decrypting of the message $m_3$ is the content decryption key $k_cDK$.

FIG. 6B illustrates a sequence chart of the functional encryption key distribution illustrated in FIG. 6A. In particular, FIG. 6B illustrates messaging between a user node 602, distributor 604, and content provider 606.

The user node 602 sends a content request to the distributor 604 as message $m_1$ 608. As is outlined above, the content request $m_1$ ($m_1=(f_1, T)$) comprises a functionally encrypted user identifier and content identifier, along with a transaction ID.

The distributor 604, upon reception of the content request, then forwards the content request $m_1$ 610 to the content provider 606.

The content provider 606, upon reception of the content request from the distributor 604, decrypts the message using a functional content identifier decryption key to identify the requested content, encrypts the requested content, and sends a content reply $m_2$ ($m_2=(f_1, Enc(k_{CEK}(Content), T))$) comprising the content request along with the encrypted content to the distributor 604.

The distributor 604, upon reception of the content reply $m_2$, decrypts the message using a functional user identifier decryption key to identify the user, then creates a message $m_3$ ($m_3=(User\ ID, Enc(k_{CEK}(Content)))$) comprising the user ID and the encrypted content. The distributor 604 then sends message $m_3$ 614 to the user node 602.

The user node 602 then decrypts the message $m_3$ using a content decryption key to resolve the content.

FIG. 7 illustrates an example of the end-to-end process of user requesting and receiving content, including the process of key distribution, for example, which may be a combination of the processes illustrated in relation to FIGS. 5 and 6.

At block 702, a user requests the functional encryption key from the key service (e.g. a key manager).

At block 704, the key service creates a master key (MK) and a functional encryption key $k_f$ associated with the master key, as is shown in equation 10 below.

$$(k_f, MK) \leftarrow create\_Keys \qquad 10$$

The key service then sends the functional encryption key to the user node.

At block 706, the key service creates functional decryption keys $k_d$ (in particular, a user identifier decryption key and a content identifier decryption key) associated with the master key and function $d-k_d\leftarrow keygen\ (MK, d)$. the key service then sends functional decryption keys to the distributor and the content provider. In particular, the user decryption key is sent to the distributor, and the content decryption key is sent to the content provider.

At block 708, the user node advantageously encrypts message x with a functional encryption key as is shown in equation 11 below:

$$c \leftarrow enc(k_f, x) \qquad 11$$

and sends the encrypted message c as a content request to the distributor.

At block 710, the distributor forwards the content request to the content provider.

At block 712, the content provider resolves the content ID. In particular, the content provider decrypts result y from the message c with its functional decryption key. Result y is restricted by processing the function space d as shown in equation 12 below.

$$y \leftarrow dec(k_d, c) \qquad 12$$

At block 714, the content provider encrypts and sends the content along with the content request to the distributor in a content reply message.

At block 716, the distributor resolves the user ID using the transaction ID related function. In particular, the distributor decrypts result y from the message c with its functional decryption key. Result y is restricted by processing the function space d as shown in equation 13 below.

$$y \leftarrow dec(k_d, c) \qquad 13$$

The systems and methods as described herein may prevent both the content provider from resolving the user identity, and the distributor from resolving content from the content request sent by the user, or content sent from the content provider. In the example above, for privacy, to minimize processing user data in the content delivery process, functional encryption is applied during a content publishing and delivery process, in particular, by incorporating the use of functional encryption at a user node, a distributor, and a content provider. Thus, content may only be available to the "right" users, for example, where specific content and quality of content may only be available to a user node possessing the decryption key.

In some examples, the content sent by the content provider is encrypted using functional encryption. This may be advantageous where a content identifier identifies the same content having different formats, or different level of quality. For example, the content provider may send a plurality of content items, such as content items with different levels of quality, whereby functional encryption may be used to ensure that a user to whom the content is sent can only decrypt the part of the message (e.g., content items) which they are authorized to decrypt (e.g., by use of a particular decryption key for a corresponding part of the message, such as content of a particular quality). The key manager may therefore perform a function of generating and providing a functional encryption key to the content provider for the encryption of content, and may then provide to the user a corresponding functional content decryption key for decrypting the content. The functional content decryption key provided to the user may depend on predefined conditions relating to that user, for example, based on service level agreement, SLA, and/or content distribution network, CDN, policy for a device (e.g., a device of the user). The methods and systems herein may thus provide granular access control through the use of functional encryption. In particular, enabling granular access for the data enables enforcing privacy of the sender and, if desired, the receiver.

In some examples, the key manager may also provide, to the distributor, a corresponding user identifier decryption key. A functionally encrypted message may then be sent from the content provider to the distributor, where the distributor is able to resolve the user identifier using the user identifier decryption key, and forward the message to the user corresponding to the user identifier key. The user may then decrypt the content (e.g., one content item from among the content) using their functional decryption key.

The encryption of the content may be performed subsequent to at least some of the processes above, such as in response to receiving the content request from the distributor at the content provider.

Figure 8:
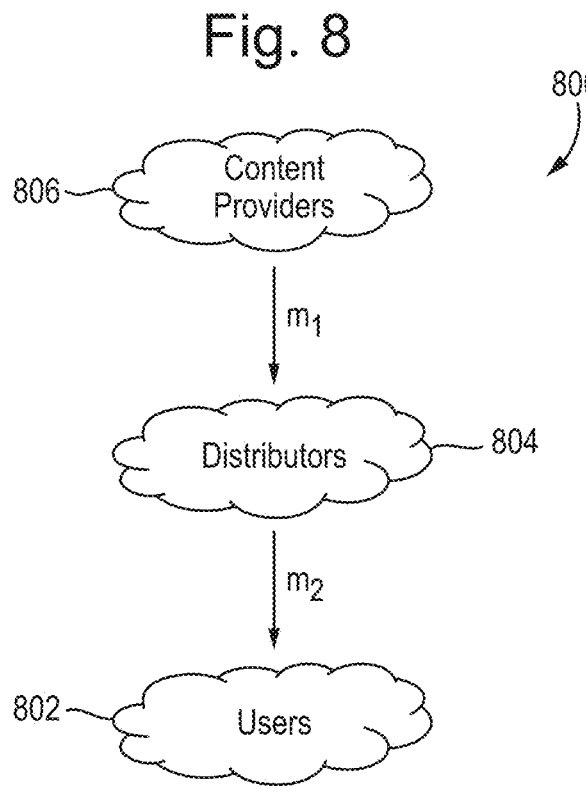
FIG. 8 illustrates a flowchart representing a process for content distribution, in accordance with some examples of the disclosure.

FIG. 8 illustrates an example of content distribution in which the content is functionally encrypted. In particular, FIG. 8 illustrates a system 800 comprising a user node 802, distributor 804, and a content provider 806.

The process may begin as is illustrated in blocks 702 to 712 of FIG. 7. For example, a user may send a functionally encrypted request for content to a distributor, which is passed to a content provider.

In response to receiving the functionally encrypted content request, the content provider may decrypt the message using a functional content identifier decryption key to identify content which corresponds to the identifier. The content provider may then encrypt content (e.g., comprising a plurality of content items corresponding to the identifier) using a functional encryption key $k_F$ (provided by a key manager) corresponding to function $f=(k_i, k_{i+1}, \ldots, k_{i+n}$ (Content)), the functionally encrypted content being as shown in equation 14.

$$Enc(k_i(\text{Content})) \qquad 14$$

The content provider then sends, to the distributor, a content reply message $m_1$, comprising the functionally encrypted content request $f$ and additionally the functionally encrypted content, as shown in equation 15.

$$m_1 = (f, Enc(k_i(\text{Content}))) \qquad 15$$

Preconditions for the encryption of the content are the functional encryption key=$k_F(k_i, k_{i+1}, \ldots, k_{i+n})$, and that the user ID is functionally encrypted ($k_u$).

In response to receiving the content reply message $m_1$, the distributor then decrypts the content reply message to resolve the user identifier using a functional user identifier decryption key (e.g., provided by the key manager), as is shown below.

$$Dec(f) \leftarrow \text{“User } ID\text{”} \qquad 16$$

A precondition of the decryption of the content reply message is the functional user identifier decryption key $k_u$.

The distributor then creates and sends a second content reply message $m_2$ as shown in equation 17 to the user corresponding to the user identifier, the second content reply message comprising the user identifier along with the encrypted content.

$$m_2 = (\text{User } ID, Enc(k_i(\text{Content}))) \qquad 17$$

In response to receiving the second content reply message $m_2$, the user then decrypts the content using a functional content decryption key which has been provided to the user based on a predefined condition associated with the user, such as the quality of content that the user is able to consume.

$$Dec(m_2) \leftarrow \text{“Content”} \qquad 18$$

A precondition of the decryption of the content item is a content decryption key $k_i$.

In some examples, the content provider 806 may send the same encrypted content to a plurality of user nodes 802, where each user node is provided with a functional decryption key corresponding to the predefined condition associated with that user, whereby a user node is only able to decrypt a part of the content that they are authorized to access. Thus, the processing requirements of the content provider may be reduced, as one encryption may be performed for multiple users requesting the same content.

In some examples, the method is similar to that illustrated in FIG. 8 (e.g., the content is functionally encrypted), however, a designated distributor is not required. Instead, the message $m_1$ sent from the content provider to the distributor in FIG. 8 is cached in the content distribution network (CDN), where a user may then retrieve the message. For example, the content provider may be able to send and receive messages through the content distribution network to the user node, where the content distribution network acts as an intermediary entity. The content delivery network may therefore cache a message from the distributor comprising encrypted content, where a user node may retrieve the message, where the relevant message may be identified based on, for example, the transaction identifier associated with the message, as is described above. This may enable faster distribution of content than a scenario in which a dedicated distributor is provided.

In some examples, encrypted dynamic adaptive bitrate streaming technology, such as MPEG-DASH, may be used to transfer data to a user by partitioning the data into one or more segments to be delivered to the user. As is described above, the data may be encrypted using functional encryption, such that data segments require particular functional decryption keys in order to be decrypted. Thus, the data may be encrypted such that only the segments of the data which correspond to a user's service level agreement (SLA) can be decrypted by the user using a corresponding functional decryption key(s) (for example, the user may only be able to decrypt data corresponding to their agreed streaming quality).

In some examples, instead of (or in addition to) encrypting the content using functional encryption, as is described above, content encryption keys are used to encrypt the content. In such an example, a content item is divided into a plurality of slices, where each slice may be individually encrypted. One key may be provided per slice, where each key may be time-specific and/or memory-space specific. For example, a key may expire (e.g., after a predetermined time period, or after a predetermined time), such that the key is no longer usable for encryption or decryption. A key may be time specific and/or region specific such that the key is only usable to decrypt content at or after a certain time, and/or within a certain region. The decryption keys corresponding to the encryption keys used to encrypt the slices may then be functionally encrypted, so that individual decryption keys may be decrypted based on particular functional decryption keys, and then sent to the user node. As the user is only able to decrypt particular keys, for example, using functional decryption keys provided by a key service, they are only able to then decrypt particular slices of content, which may correspond, for example, to the user's level of authorization.

For example, the content provider may encrypt the content using a plurality of content encryption keys. A key manager, who in this case may be a license server, may then provide the user with functionally encrypted content decryption keys corresponding to the content encryption keys, where the user may additionally be provided with functional decryption keys which are able to decrypt particular content decryption keys corresponding to particular slices of the content.

In some examples, "bulk" content may be available in a cache of the CDN, or at a distributor (e.g., in a cache memory or storage of a distributor). Bulk content contains several different types of data, where different parts of the data may be encrypted with functional keys. The cache or the distributor storing the data is not able to determine the specific content that the user will utilize from the bulk of the data, as the user may request the bulk content from the cache or distributor, where the user may then only decrypt a part of the bulk content to resolve a specific piece of content based on the functional decryption key that the user possesses, once the bulk content has been sent to the user. For example, in response to receiving a request for content at a cache memory or a distributor, the user node may be provided with the bulk content, where a decryption key provided, for example, by a license server may be used to decrypt a part of the bulk content corresponding to the content request. Advantageously, the same bulk content may be sent different users, thereby reducing processing requirements of the distributor.

Figure 9:
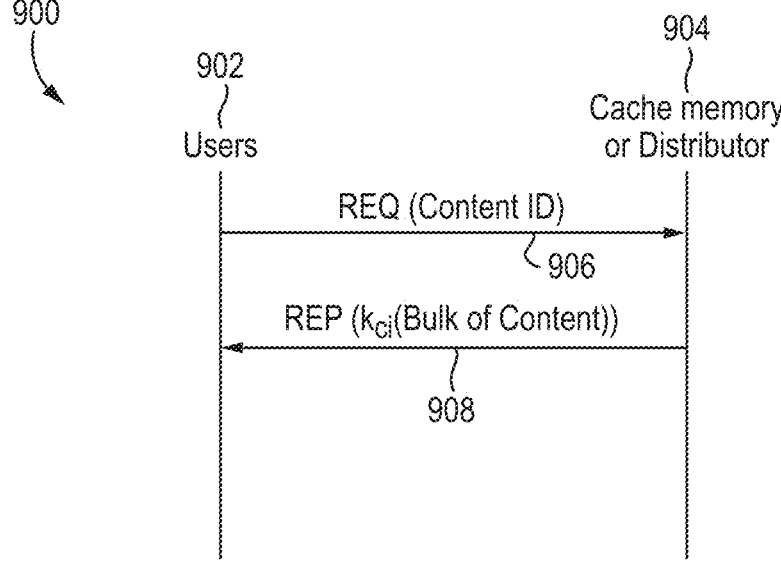
FIG. 9 illustrates a process of bulk content distribution, in accordance with some examples of the disclosure.

FIG. 9 illustrates an example of the process involved in retrieving particular content from bulk content. In particular, FIG. 9 illustrates a system 900 comprising a user node 902 and a cache memory or distributor 904.

A user node 902 sends, for example, to a cache memory or a distributor, a content request message 906 comprising a content identifier indicating the content that the user would like to receive.

In response to receiving the content request, the cache memory or distributor 904 responds by sending a content response message 908 comprising bulk content which has been functionally encrypted. The user then decrypts the bulk content using a functional decryption key (e.g., received from a license server), in order to resolve a part of the bulk content, such as one content item, $k_{ci}$.

In some examples, in addition to any of the processes described above, the user may, in addition to consuming content, act as a (sub) contributor and/or a review of the content, while retaining anonymity. The process of a user requesting and receiving content may follow that illustrated in FIG. 6A. Once the content is received by the user, the user may add a contribution and/or a review to the content. Then, the user encrypts a message comprising the content along with the contribution and/or review, and sends the message to the distributor (the distributor may resolve the user identifier, as described above). The distributor then forwards the message to the content provider. The content provider then decrypts the message to resolve the content, and the additional contribution and/or review. In this instance, it may be assumed that the key service provides the user node with a functional encryption key to encrypt the content, and provides the content provider with a functional decryption key for decrypting the content, such that the content provider can decrypt the content along with the additional contribution/review.

The actions or descriptions described herein may be done in any suitable alternative orders or in parallel to further the purposes of this disclosure.

The processes described above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features and limitations described in any one example may be applied to any other example herein, and flowcharts or examples relating to one example may be combined with any other example in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:

receiving, using control circuitry of a distributor node, a functionally encrypted content request comprising a user identifier and a content identifier, wherein the user identifier is separate from the content identifier;

sending, to a content provider and using the control circuitry, the functionally encrypted content request;

receiving, using the control circuitry, a first content reply comprising the functionally encrypted content request and encrypted content corresponding to the content identifier, the content identifier having been resolved from the functionally encrypted content request by decrypting the functionally encrypted content request using a functional content identifier decryption key, wherein the functional content identifier decryption key used to resolve the content identifier is provided to the content provider without a functional user identifier decryption key used to resolve the user identifier;

decrypting, using the control circuitry, the first content reply using the functional user identifier decryption key to resolve the user identifier, wherein the functional user identifier decryption key used to resolve the user identifier is provided to the distributor node without the functional content identifier decryption key used to resolve the content identifier; and sending, to a user node corresponding to the user identifier and using the control circuitry, a second content reply corresponding to the first content reply.

2. The method of claim 1, wherein the method further comprises receiving at least one functional user identifier decryption key.

3. The method of claim 1, the method further comprising:

receiving, using the control circuitry, a transaction identifier along with the functionally encrypted content request;

sending the transaction identifier along with the functionally encrypted content request to the content provider; and wherein the first content reply is decrypted using a functional user identifier decryption key corresponding to the transaction identifier.

4. The method of claim 1, wherein a content distributor network acts as the distributor node.

5. The method of claim 1, wherein the method further comprises receiving an encrypted content response comprising the content reply and a contribution of a user, and sending the encrypted content response to the content provider.

6. The method of claim 1, wherein the functional content identifier decryption key is provided to the content provider and the functional user identifier decryption key is separately provided to the distributor node using a key manager node.

7. A method for content distribution at a user node, the method comprising:

sending, to a distributor and using control circuitry of the user node, a functionally encrypted content request comprising a user identifier and a content identifier, wherein:

the user identifier is sent to the distributor separate from the content identifier, the content identifier is sent to a content provider, the distributor is configured to decrypt the user identifier using a functional user identifier decryption key separate from a functional content identifier decryption key, and the content provider is configured to decrypt the content identifier using the functional content identifier decryption key;

receiving, from the distributor and using the control circuitry, a content reply comprising encrypted content; and decrypting, using the control circuitry, the content.

8. The method of claim 7, wherein the content is functionally encrypted, and wherein the user node decrypts the content using a functional content decryption key.

9. The method of claim 8, wherein the functional content decryption key corresponds to a predefined condition.

10. The method of claim 7, the method further comprising:

receiving a functionally encrypted content decryption key message comprising a plurality of functionally encrypted content decryption keys;

decrypting the functionally encrypted content decryption key message to resolve a content decryption key; and using the content decryption key to decrypt the content.

11. A system comprising control circuitry of a distributor node configured to:

receive a functionally encrypted content request comprising a user identifier and a content identifier, wherein the user identifier is separate from the content identifier;

send the functionally encrypted content request to a content provider;

receive a first content reply comprising the functionally encrypted content request and encrypted content corresponding to the content identifier, the content identifier having been resolved from the functionally encrypted content request by decrypting the functionally encrypted content request using a functional content identifier decryption key, wherein the functional content identifier decryption key used to resolve the content identifier is provided to the content provider without a functional user identifier decryption key used to resolve the user identifier;

decrypt the first content reply using the functional user identifier decryption key to resolve the user identifier, wherein the functional user identifier decryption key used to resolve the user identifier is provided to the distributor node without the functional content identifier decryption key used to resolve the content identifier; and send a second content reply corresponding to the first content reply to a user node corresponding to the user identifier.

12. The system of claim 11, wherein the control circuitry is further configured to receive at least one functional user identifier decryption key.

13. The system of claim 11, wherein the control circuitry is further configured to:

receive a transaction identifier along with the functionally encrypted content request;

send the transaction identifier along with the functionally encrypted content request to the content provider; and decrypt the first content reply using a functional user identifier decryption key corresponding to the transaction identifier.

14. The system of claim 11, wherein a content distributor network acts as the distributor node.

15. The system of claim 11, wherein the control circuitry is further configured to receive an encrypted content response comprising the content reply and a contribution of a user, and send the encrypted content response to the content provider.

16. The system of claim 11, wherein the functional content identifier decryption key is provided to the content provider and the functional user identifier decryption key is separately provided to the distributor node using a key manager node.

17. A system comprising control circuitry of a user node configured to:

send, to a distributor, a functionally encrypted content request comprising a user identifier and a content identifier, wherein:

the user identifier is sent to the distributor separate from the content identifier, the content identifier is sent to a content provider, the distributor is configured to decrypt the user identifier using a functional user identifier decryption key separate from a functional content identifier decryption key, and the content provider is configured to decrypt the content identifier using the functional content identifier decryption key;

receive, from the distributor, a content reply comprising encrypted content; and decrypt the content.

18. The system of claim 17, wherein the content is functionally encrypted, and wherein the user node decrypts the content using a functional content decryption key.

19. The system of claim 18, wherein the functional content decryption key corresponds to a predefined condition.

20. The system of claim 17, wherein the control circuitry is further configured to:

receive a functionally encrypted content decryption key message comprising a plurality of functionally encrypted content decryption keys;

decrypt the functionally encrypted content decryption key message to resolve a content decryption key; and use the content decryption key to decrypt the content.

* * * * *